United States Patent [19]
White

[11] 3,841,644
[45] Oct. 15, 1974

[54] LOW FRICTION SEALING RING

[76] Inventor: Charles S. White, 35815 42nd St. East, Palmdale, Calif. 93550

[22] Filed: Feb. 14, 1973

[21] Appl. No.: 332,419

Related U.S. Application Data

[63] Continuation-in-part of Ser. No. 316,844, Dec. 28, 1972, which is a continuation-in-part of Ser. No. 76,110, Sept. 28, 1970, abandoned.

[52] U.S. Cl................ 277/158, 277/165, 277/213, 277/204, 156/169
[51] Int. Cl............................................ F16j 15/00
[58] Field of Search .......... 277/213, 204, 165, 158, 277/196

[56] References Cited
UNITED STATES PATENTS
2,676,823  4/1954  Olson et al........................ 277/204
2,819,919  1/1958  Pearce et al....................... 277/204

*Primary Examiner*—Samuel B. Rothberg

[57] ABSTRACT

A shaft or piston ring type seal is formed in the shape of a radially corrugated, radially expansible and contractible continuous annulus which is adapted to have a peripheral edge urged into sealing engagement with a cooperating cylindrical surface by a resilient ring abutting the other peripheral surface of the annulus, and wherein the annulus is formed by making a preform by helically winding into the shape of an annular flat washer a continuous strand of a low friction thread impregnated with a bonding resin and then with heat and pressure crimping the preform along radial lines into a corrugated configuration and curing the resin to integrate the helical turns.

7 Claims, 8 Drawing Figures

PATENTED OCT 15 1974 3,841,644

LOW FRICTION SEALING RING

RELATED APPLICATIONS

This application is a continuation-in-part of my U.S. Pat. application Ser. No. 316,844 filed Dec. 28, 1972 which in turn is a continuation-in-part of Ser. No. 76,110, filed Sept. 28, 1970 now abandoned.

FIELD OF INVENTION

This invention relates to a low friction sealing ring having particular though not exclusive utility for use as a piston ring or as a shaft or rod seal as in a packing gland for a piston rod, and to a method of making the sealing ring.

BACKGROUND OF THE INVENTION

In my aforesaid application, Ser. No. 76,110, I disclosed a seal in the form of a low friction circular element formed by a plurality of turns of low friction thread and wherein the circular element was corrugated to provide for radial expansion or contraction and have a periphery urged against a surface to be sealed by a resilient or elastomeric material engaging the opposite edge of the ring. The present application enlarges upon the disclosure of such aforesaid application and includes details as to the method of manufacturing the sealing ring.

Metallic corrugated sealing rings are old in the art as exemplified by U.S. Pat. No. 2,044,272. However, such a ring has a high coefficient of friction and will tend to wear itself or the surface against which it is in bearing engagement. Therefore, there is a need for a sealing ring which will have low friction coefficient and will, without the necessity of lubrication, effect a fluid tight seal with a mating cylindrical surface.

SUMMARY OF THE INVENTION

I have found that an effective seal against a relatively moving cylindrical surface can be effected utilizing an annular, radially corrugated, sealing member formed by helically winding resin impregnated bondable low friction thread into a preform having the shape of a flat washer and then upsetting it along radial lines into a corrugated configuration and curing the resin to bond the helical turns to each other and with the low friction thread at the peripheral edge of the annulus effecting a low friction sealing contact with the cylindric surface against which it bears. By virtue of the corrugations the ring may radially expand or contract to conform to the cylindric surface, either the internal surface of a cylinder or, for example, the external surface of a piston rod, and by the provision of a resilient ring bearing circumferentially against the opposite edge of the annular seal member, not only is such opposite edge sealed by the resilient ring, but in addition the seal member is continuously urged in sealing engagement against the relatively moving cylindrical surface of the cylinder wall or piston rod to effect a fluid tight seal therewith. As disclosed herein the sealing ring may be formed by winding bondable low friction thread impregnated with a bonding resin into the shape of a flat washer with the thread turns bonded lightly together. The thus made preform is then placed between crimping dies to effect radial corrugations and sizing and shaping of the sealing ring and with heat the resin is finally cured to effect the final bonding of the turns of the helical winding. By virtue of the use of a low friction thread, a continuous sealing edge may be effected at either the exterior or the interior peripheral edges (or both) of the ring.

BRIEF DESCRIPTION OF PREFERRED EMBODIMENTS

Figure 1:
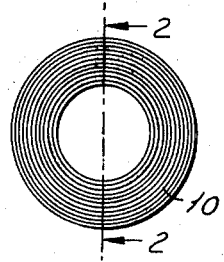
FIG. 1 is a front view of a preform useful in the method of making the sealing ring herein disclosed.
Figure 2:
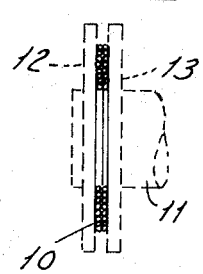
FIG. 2 is a cross-sectional view of the preform taken along the line 2—2 of FIG. 1.

In FIGS. 1 and 2 I have disclosed a preform 10 useful in carrying out the manufacture of a sealing ring embodying this invention. The preform is desirably made by winding on a mandrel 11 or the like between a pair of closely spaced plates 12 and 13 as indicated in phantom outline in FIG. 2, a continuous strand of a resin impregnated bondable low friction thread to build up a flat washer-like annulus composed entirely of such resin impregnated thread. As shown in FIG. 2 the preform is illustrated by two turns arranged side by side in a multiplicity of radially outwardly progressing helical layers. It is to be understood that the number of layers and the number of turns in each layer illustrated in FIG. 2 is merely representative and in actual practice the number of layers and the number of adjacent helical turns will depend on the diameter of the thread employed, the thickness of the annular seal desired as well as its diameter. Details of the resin impregnated thread are disclosed in the aforesaid application as well as in my co-pending application, Ser. No. 316,844, filed Dec. 20, 1972, Attorney's Docket No. B&P 72097-M.

The term bondable low friction thread refers to a thread made up in either of two fashions, i.e. the thread is composed of Teflon fibers which have been coated with a very thin layer of metal such as by vacuum depositing a layer of silver thereon, or Teflon fibers and bondable fibers, such as Dacron, cotton and the like, are intertwined to form a composite thread. Either of these approaches results in a bondable low friction thread whose helical turns following winding may be bonded together using conventional bonding resins such as phenol formaldehyde, urea formaldehyde, melamine formaldehyde, urethane and the like.

In the preferred embodiment the thread is pre-impregnated with a thermosetting bonding resin of the types mentioned and the bonding resin is partially cured, as for example, to the B-stage, so that most of the volatile solvents are driven out before the thread is wound into the shape of the preform shown in FIGS. 1 and 2. During winding into the preform a further application of heat or a light application of solvent to the thread will slightly soften the resin, such that the resin impregnated turns will stick togehter and sufficiently integrate the turns of the threads so that the preform can be subsequently handled.

Figure 4:
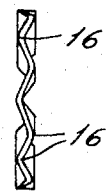
FIG. 4 is an edge view of the sealing ring shown in FIG. 3.
Figure 5:
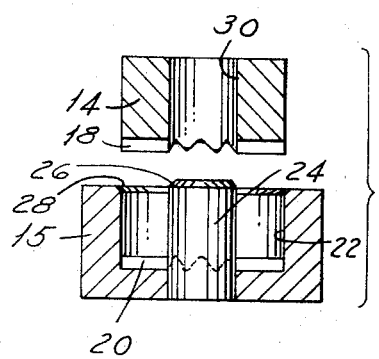
FIG. 5 is illustrative of the dies for crimping the preform of FIGS. 1 and 2 in making the sealing ring shown in FIGS. 3 and 4.
Figure 6:
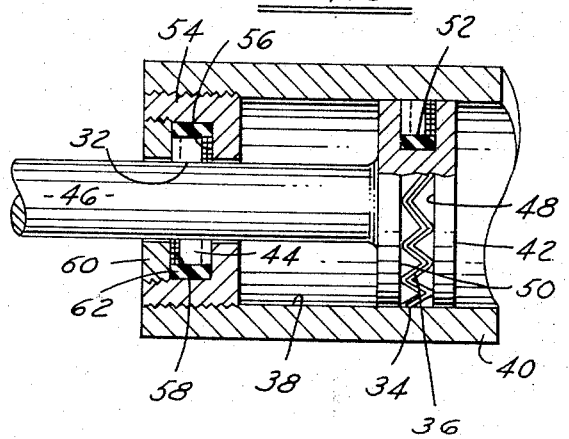
FIG. 6 is illustrative of the use of the sealing ring of FIGS. 3 and 4 both as a piston ring seal and as a shaft or rod seal in a stuffing box.

Following manufacture of the B-stage preform it is placed between cooperating forming dies 14 and 15 shown in FIG. 5 where it is shaped into the sealing ring with radially extending corrugations 16. The corrugations comprise oppositely displaced portions of the sealing ring annulus and may have rather sharp crests as shown in FIGS. 4 or 6, or may be more rounded as in the sine wave structure of FIG. 8. The bottom of the male die 14 is configured with a corrugated or undulating surface 18 which matches the corrugations intended in the sealing ring. In the bottom of the female die 15 corresponding corrugations 20 are provided. Extending up through the bottom of the female die and concentric with the cylindrical wall 22 thereof is a core post or pin 24 whose upper edge may be bevelled as at 26, as is the entrance 28 of the female die. The male die 14 is provided with a bore 30 for receiving the core pin or post 24.

Either or both of the surfaces of the core pin 24 and the cylindrical wall 22 may be finished as high in microfinish as the surface against which the sealing ring is to effect its moving seal, so that the corresponding peripheries of the sealing ring will be of a finish corresponding to such surfaces so that when engaged with the cylindrical surface to be sealed the peripheral edge of the sealing ring will effect a good seal therewith. In other words, the inner peripheral edge 32 of the sealing ring which is formed about the core post 24 will have a smoothness corresponding to that of the surface of the core post and if such inner peripheral edge is to effect a seal with a rod or shaft, the surface of the core post should have a micro-finish corresponding to that of the rod or shaft. The outer peripheral edge 34 of the ring should be treated in like fashion if it is to effect a seal with the interior wall of a cylinder. In either event the peripheral edge of the sealing ring should be formed to present a smooth continuous surface complementing the surface against which it is intended to seal.

The diameter of the wall 22 of the female die 15 is slightly oversize the exterior diameter of the preform 10, and the internal diameter of the preform 10 is just slightly oversize the diameter of the core post 24 so that the preform will fit within the annular cavity defined by the post and the wall 22 of the female die. Upon movement of the male die 14 down into this cavity, the preform is crimped as above mentioned. This causes a stretching of the fibers of the preform within their elastic limits and an axial compaction of the thread turns. Such compression also effects a radial expansion both inwardly and outwardly so that the peripheral edges 32 and 34 of the preform are tighly compressed against the cylindrical wall 22 and the surface of the core post 24. At such peripheral edges the helical turns of the low friction bondable thread are, however, arranged in substantially continuous facial presentation at the edges to provide a low friction sealing surface thereat. During the forming operation preferably both the male and female die elements are heated to effect the cure of the bonding resin to the C-stage. By virtue of the fact that prior to this final molding the preform has been cured to the B-stage, the resin is substantially free of further volatile solvents and therefore the sealing ring will be free of voids or other interruptions in its integrity and the resin will form a continuous solid matrix enveloping the bondable thread and bonding the turns thereof together.

In FIG. 6 I have shown two environments for the ring. At 36 the ring is utilized as a piston ring and effects a sliding fluid tight seal at its outer peripheral edge 34 against the internal surface 38 of a cylinder 40 within which a piston 42 reciprocates. At 44 the ring is shown in the environment of a stuffing box to effect a fluid tight seal at its inner periphery 32 with a piston rod 46. The piston 42 is provided with a peripheral groove within which the sealing ring is received. The peripheral groove has opposed groove walls 48 and 50 which overlie opposite faces of the sealing ring to prevent any substantial relative axial displacement of the ring and the piston during axial reciprocation of the piston within the cylinder 40. A resilient continuous force ring 52 which may be of a suitable elastomeric material such as rubber, urethane, neoprene or the like is disposed in the bottom of the ring receiving groove and bears outwardly against the inner peripheral edge 32 of the ring to effect a seal between such edge and the groove and to bias the ring radially outwardly against the cylindrical wall 38 to effect a seal therewith at the outer peripheral edge 34 of the ring. By virtue of the corrugations 16 in the ring, the ring may be radially expanded to pass over the outer periphery of the piston and then radially collapsed into the groove so that its inner peripheral edge 32 will seat against the elastomeric force ring 52. With the seal ring in the groove, the piston may be entered into the cylinder by radially compressing the ring 36 and this in turn will cause the force ring 52 to be yieldingly displaced sufficiently to allow the piston and sealing ring to enter the cylinder, wherein the force ring will radially expand the sealing ring to effect a continuous sliding fluid tight seal with the cylinder wall.

In the case of the stuffing box environment, the cylinder is closed at one end by an end wall 54, which in the case illustrated is threaded into the end of the cylinder 40. The end wall is provided with a seal ring receiving groove defined by a wall surface 56 and a face 58 of a stuffing box nut 60 threaded into the end wall 54. The walls 56 and 58 overlie opposite faces of the ring 44 to prevent any substantial relative axial movement between the stuffing box and the ring. A resilient force ring 62 similar to the force ring 52 is located in the bottom of the stuffing box groove to bear against the outer peripheral edge 34 of the sealing ring to seal the ring and groove and bias the inner peripheral edge 32 in fluid tight encircling engagement with the surface of the piston rod 46. The sealing ring may be initially inserted in the stuffing box groove by radially collapsing it to fit within the force ring 62. The sealing ring is thereafter radially expanded against the elastomeric force ring to allow the piston rod 46 to enter the hole in the ring defined by the inner peripheral edge 32.

Figure 7:
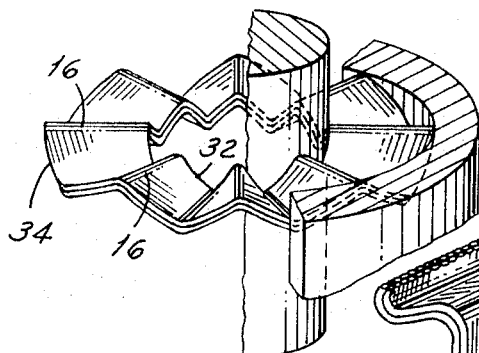
FIG. 7 illustrates in perspective view the mating engagement of the inner and outer peripheries of a sealing ring embodying the invention with concentric cylindrical surfaces to illustrate how a fluid tight seal is effected therewith.

In FIG. 7 I have illustrated in perspective view how the sealing ring effects a seal against either its inner or its outer periphery. Such FIGURE is not intended to necessarily depict a typical installation because the elastomeric force ring is not shown for radially urging a peripheral edge of the sealing ring against a surface to be sealed, but the illustration brings out that the inner and outer peripheral edges respectively 32 and 34 are smoothly curved to closely and continuously fit corresponding cylindrical surfaces with which they are intended to mate. One advantage of the sealing ring is that by virtue of the corrugations 16 it can flex radially and conform to a slightly out-of-round condition of a cylindrical surface against which it is urged and thereby seal against such surface. In FIG. 7 the sealing ring is shown as having two juxtaposed turns of thread within the thickness of the ring but this is to be understood as merely exemplary and in practice the sealing ring may have a greater number of juxtaposed turns between its faces.

Figure 3:
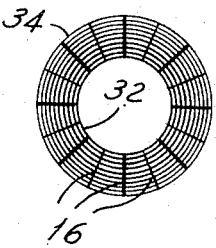
FIG. 3 is a front view of the finished sealing ring of this invention.
Figure 8:
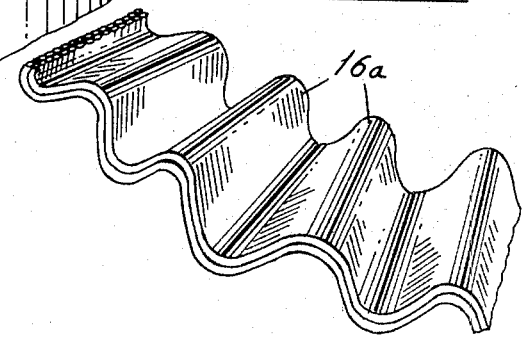
FIG. 8 is a fragmentary perspective of a section of a sealing ring having a sine wave corrugation.

In FIG. 8 I have shown a fragmentary view in perspective of a sealing ring embodying the invention. In this case it will be noted that the corrugations 16a are in the form of a sine wave rather than the more sawtoothed configuration shown in the construction of FIGS. 3, 4 and 7.

While the sealing ring has been shown for environment of relatively reciprocating machine parts, it is to be understood that it will be suitable for use to seal between relatively rotating parts as, for example, if the shaft or rod 46 was intended to rotate rather than reciprocate.

What is claimed is:

1. A low friction sealing ring comprising: an annulus having a continuous peripheral edge formed of a continuous helical winding of bondable low friction thread impregnated with a bonding resin cured to a solidifed matrix bonding the thread turns to each other, and said annulus having radially extending corrugations rendering the annulus radially expansible and contractible to closely conform to a cylindrical surface against which the peripheral edge of the annulus is adapted to bear to form a seal therewith.

2. The invention defined by claim 1 characterized in that the entire annulus is formed by said helical winding.

3. The invention defined by claim 2 characterized in that said peripheral edge is an outer peripheral edge of the annulus.

4. The invention defined by claim 2 characterized in that said peripheral edge is an inner peripheral edge of the annulus.

5. A sealing assembly comprising: a pair of interfitting members having concentric radially spaced apart cylindrical inner and outer opposed surfaces, a sealing annulus disposed between said surfaces and having opposite faces and inner and outer peripheral edges with one edge engaging the cylindrical surface on one of said members, means on the other of said members overlying said faces of the sealing annulus for preventing any substantial relative axial displacement between the annulus and such other member, said annulus formed of a helical winding of bondable low friction thread impregnated with a bonding resin cured to a solidified matrix bonding the thread turns to each other, said sealing annulus having radially extending corrugations rendering the annulus radially expansible and contractible, and resilient means disposed between the other peripheral edge of the sealing annulus and said other member for biasing said one edge of the sealing annulus into fluid tight sealing engagement with the cylindrical surface it engages.

6. The invention defined by claim 5 characterized in that said members are relatively reciprocable cylinder and piston elements, and said one edge of the sealing annulus is the outer edge and engages the cylinder element to effect a sliding seal therewith, and the resilient means comprises an elastomeric ring disposed between the piston element and the inner peripheral edge of the sealing annulus to effect a seal thereat and bias the annulus radially outwardly to effect a seal with the cylinder element.

7. The invention defined by claim 5 characterized in that said members are relatively reciprocable rod and wall elements and said one edge of the sealing annulus is the inner edge and engages the rod element to effect a sliding seal therewith and the resilient means comprises an elastomeric ring disposed between the wall element and the outer peripheral edge of the sealing annulus to effect a seal thereat and bias the annulus radially inwardly to effect a seal with the rod element.

* * * * *